United States Patent [19]

Fortescue

[11] 4,000,595
[45] Jan. 4, 1977

[54] INSULATION STRUCTURE FOR PRESSURE VESSEL CAVITY

[75] Inventor: Peter Fortescue, La Jolla, Calif.

[73] Assignee: General Atomic Company, San Diego, Calif.

[22] Filed: Feb. 8, 1974

[21] Appl. No.: 440,649

[52] U.S. Cl. .................................. 52/302; 52/410; 220/9 LG

[51] Int. Cl.² ...................... E04F 17/00; E04B 2/02

[58] Field of Search ............. 220/3, 9 LG, 9 B, 13; 52/302, 303, 249, 378–383, 267–269, 407, 410, 573; 176/87

[56] References Cited

UNITED STATES PATENTS

| 2,192,933 | 3/1940 | Saborsky | 52/303 |
| 2,256,961 | 9/1941 | Pearson et al. | 52/407 |
| 2,326,717 | 8/1943 | Zeidler | 52/407 |
| 2,656,902 | 10/1953 | Gotshall | 52/269 |
| 3,288,998 | 11/1966 | Press | 52/378 |
| 3,322,141 | 5/1967 | Gans et al. | 176/87 |
| 3,530,630 | 9/1970 | Samaga | 52/573 |

FOREIGN PATENTS OR APPLICATIONS

| 559,606 | 2/1944 | United Kingdom | 52/378 |

Primary Examiner—James L. Ridgill, Jr
Attorney, Agent, or Firm—Fitch, Even, Tabin & Luedeka

[57] ABSTRACT

An insulation structure for a pressure vessel cavity is described in which a layer of fibrous insulation along the cavity wall is isolated from the remainder of the cavity to prevent circulation of fluid in the layer. Isolation is accomplished by means which define a gas flow space. Retaining means for the layer define a plurality of fluid passages communicating with the layer and allowing venting of the layer into the gas flow space upon depressurization of the cavity.

8 Claims, 4 Drawing Figures

INSULATION STRUCTURE FOR PRESSURE VESSEL CAVITY

This invention relates generally to insulation structures and, more particularly, to an improved insulation structure for a pressure vessel cavity, such as a prestressed concrete pressure vessel containing a nuclear reactor system.

Insulation structures for pressure vessel cavities are often necessary. For example, in a prestressed concrete pressure vessel for containing a nuclear reactor system, insulation structure for the interior cavities of the pressure vessel may be necessary to protect the concrete from damage due to excessive localized heating. This is particularly true in the case of high temperature gas cooled reactors in which the circulating coolant may flow through internal passages in the reactor communicating between various internal cavities containing the reactor core, coolant circulators, etc. The term "cavity" is intended to mean herein any type of cavity such as a cavity containing a reactor core, or a passage for conducting coolant between the reactor system elements.

Typical insulation structures employ a layer of fibrous insulation supported adjacent the cavity wall. A further wall is then provided for retaining the fibrous insulation in place and for preventing circulation of coolant in the fibrous insulation. The latter function is necessary in order to enable the insulation to retain good insulation properties. Upon depressurization of the reactor vessel, high pressure differences across this wall can result in permanent damage to the wall. Typically, such walls are comprised of a plurality of fitted plates with the seams between the plates being sealed. Pressure differences can result in permanent deformation of the plates, particularly if the sealing at the seams is better than expected. Danger of plate deformation is increased where there is a possibility of very rapid depressurization such as in systems where coolant is used for direct expansion in a gas turbine.

It is an object of the present invention to provide an improved insulation structure for a pressure vessel cavity.

Another object of the invention is to provide an insulation structure for a pressure vessel cavity in which depressurization of the cavity does not result in damage to the structure.

A further object of the invention is to provide an insulation structure for a pressure vessel cavity in which provision is made for venting a layer of fibrous insulation without the occurrence of excessive pressure loading on elements of the structure.

Other objects of the invention will become apparent to those skilled in the art from the following description, taken in connection with the accompanying drawings wherein.

Figure 1:
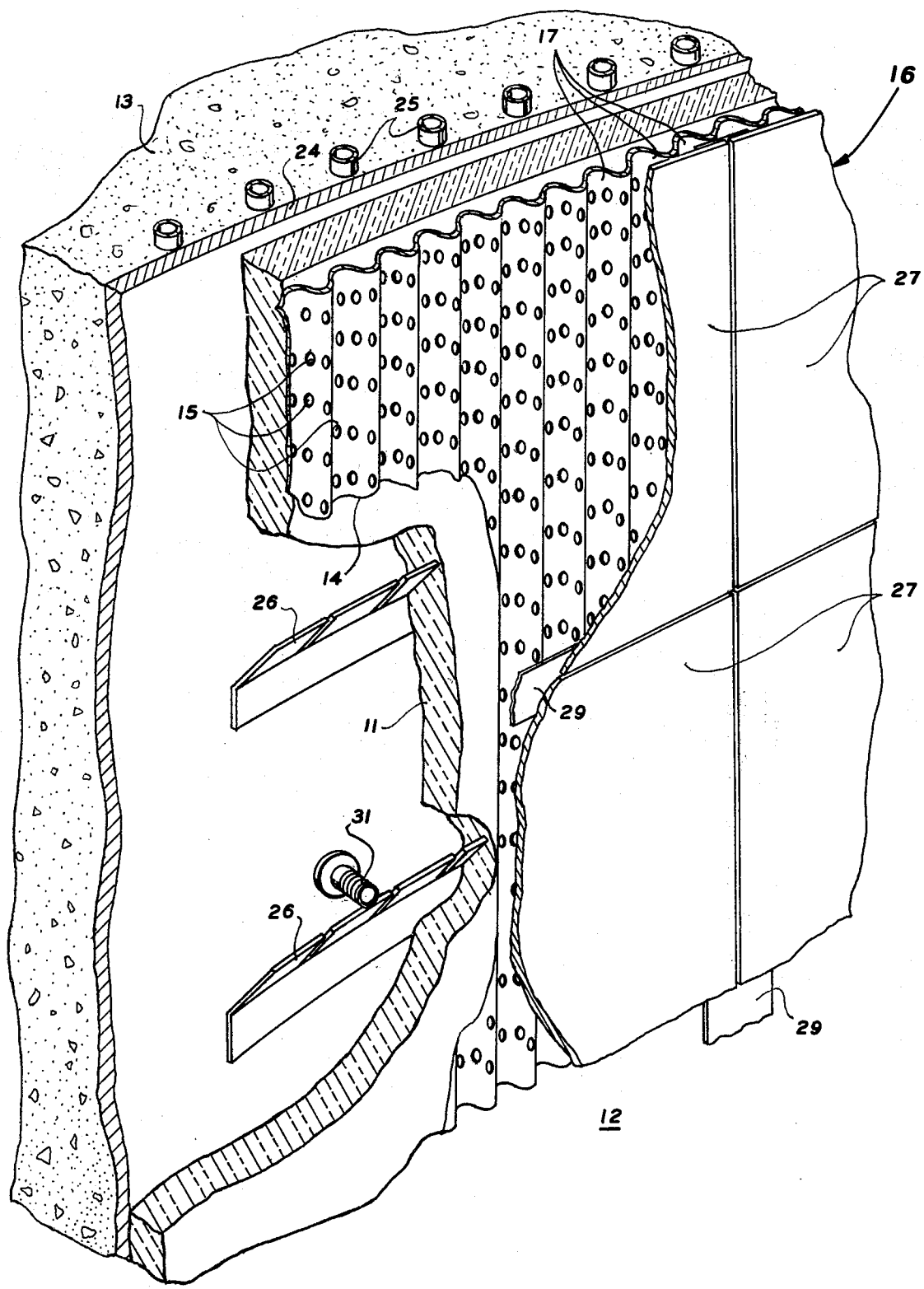
FIG. 1 is a perspective broken out and fragmented view of a portion of a pressure vessel incorporating an insulation structure in accordance with the invention.

Very generally, the insulation structure of the invention comprises a layer 11 of fibrous insulation supported adjacent the wall of the cavity 12 of a pressure vessel 13. Retaining means 14 are provided for the layer extending on the side of the layer opposite the cavity wall. Tehe retaining means define a plurality of fluid passages 15 communicating with the layer. Isolation means 16 prevent circulation of fluid in the layer. The isolation means are spaced from the layer to define a gas flow space 17 between the isolation means and the layer for venting the layer upon depressurization of the cavity.

Figure 4:
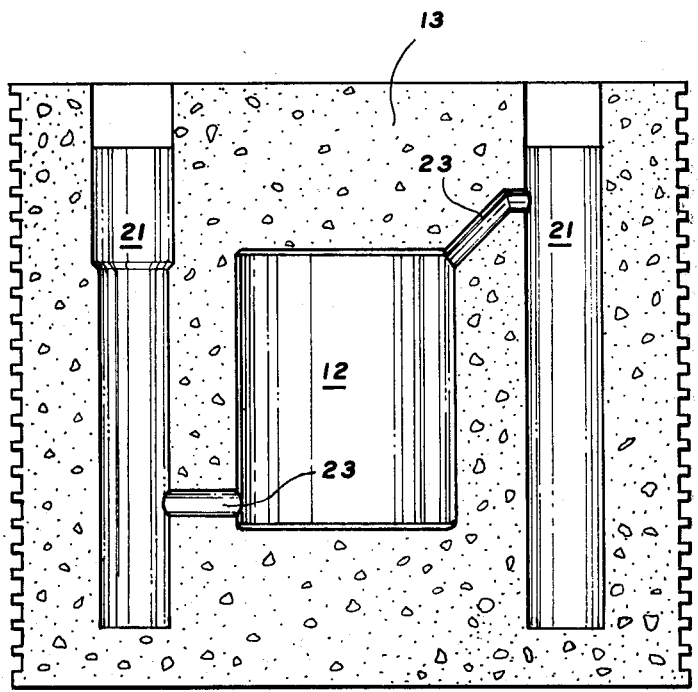
FIG. 4 is a schematic full section view of a pressure vessel of a type which may employ the invention.

Referring now particularly to FIG. 4, the FIGURE illustrates schematically a prestressed concrete reactor vessel for a high temperature gas cooled nuclear reactor. Such a pressure vessel may include a central reactor core cavity 12, and a plurality of satellite cavities 21 circumferentially surrounding the central cavity 12. The cavities 21 contain other elements (not shown) of the nuclear reactor system, such as gas coolant circulators, turbines, recuperators, precoolers, or other types of heat exchangers. Internal ducts 23 formed in the concrete pressure vessel 13 provide for flow of coolant from the reactor core cavity 12 to the various satellite cavities 21 and between the satellite cavities 21 themselves.

Typically, the internal cavities of the reactor are provided with metal liners. Between the liners and the concrete pressure vessel embedded in the concrete are provided a plurality of liner coolant circulating tubes through which a liner coolant is circulated in order to cool the metallic liners. During normal reactor operation, in order to maintain structural integrity, it is generally desirable that the metallic cavity liner be maintained at a temperature not exceeding about 150° F and that the concrete adjacent to the liner not exceed 180° F except in certain localized areas where slightly higher temperatures may be allowable. In order to meet these requirements, internal thermal insulation of the cooled metallic liners is employed. A common insulation structure includes a layer of fibrous insulating material such as that sold under the trademark KAOWOOL. A suitable barrier is then employed to prevent circulation of the reactor core coolant (e.g. helium) within the fibrous layer which, if it occurred, would substantially destroy the insulating effect of the layer. To this end, a wall is typically employed separating the fibrous layer from the remaining portion of the cavity. This wall may be constructed of a plurality of cover plates which are loosely fitted to allow for thermal expansion and contraction, but with sealing strips along the seams between the plates to prevent circulation of coolant into the fibrous material.

Figure 2:
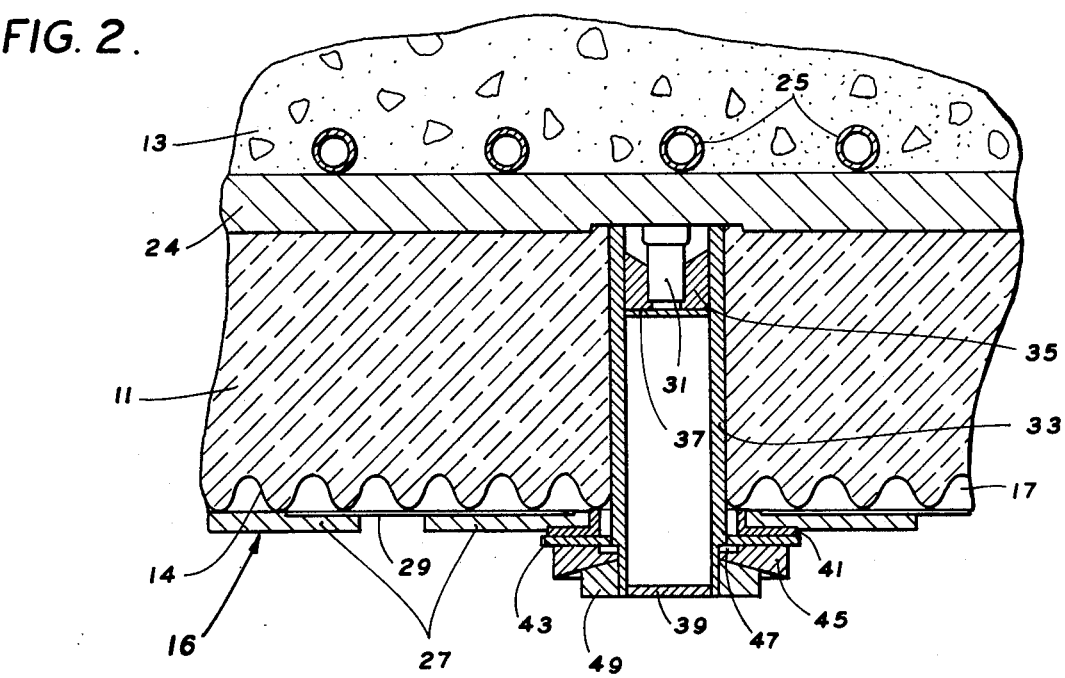
FIG. 2 is a full section view illustrating a cross section of the insulation structure of the invention.

Referring now more particularly to FIGS. 1 and 2, the metallic liner 24 for the cavity 12 is shown with a relatively thick layer 11 of fibrous insulation. At the interface between the reactor vessel 13 and the liner 24, cooling tubes 25 are provided embedded in the concrete. The insulation is supported and prevented from shifting by a plurality of support shelves 26 suitably secured to the liner. The shelves project angularly upward from the liner.

The isolation means 16 are also shown in FIGS. 1 and 2, comprising a plurality of cover plates 27 which are loosely fitted. Thin metallic sealing sheets 29 are provided along the seams between the loosely fitted plates 27 to ensure the desired isolation.

The sealing plates are each supported on a short metal stud 31 which is suitably bolted or welded to the liner 24. As may be seen in FIG. 2, an extension post 33 is provided containing an internal fitting 35 which is internally threaded to fit on and thread on the stud 31. A seal plate 37 extends across the internal space of the post or sleeve 33 inward of the fitting 35. The inner end of the sleeve 33 is closed by a plate 39 and a flanged bushing 41 is provided inserted into a mating opening in the plate 27, through which the inner end of the post 33 passes. The plate is retained in place by means of a washer 43, a sealing ring 45 having an annular seal recess 47, and a threaded nut 49. The oversized holes in the cover plates 27 at the bushings 41 allow for thermal expansion by sliding.

In accordance with the invention, retaining means 14 are provided for the insulation layer 11. The retaining means are provided with a plurality of fulid passages 15 therein, and such passages may be extremely small. Thus, the material 14 may be comprised of a porous or perforated material, preferably perforated metal sheet. These holes or passages 15 communicate with layer 11 of fibrous material. The isolation means 16 are spaced from the layer and define a gas flow space 17 between the isolation means 16 and the retaining means. In the illustrated embodiment, the retaining means comprise a corrugated wall of suitable perforated metal material which engages both the isolation means 16 and the layer 11. The corrugations are appropriately oriented to allow free passage through the space 17 for gas trapped in the fibrous layer 11 to a chosen outlet region, not shown. This outlet region may be of any suitable design, such as a narrow annular gap in the cover plates or isolation means 16 leading to a region of uniformly distributed pressure in the main gas coolant circuit of the reactor system.

During reactor operation, core coolant is allowed to permeate the fibrous layer 11, but circulation is prevented by suitable sealing. For example, the insulation may be sealed at the bottom or top by suitable annular plates, not shown. Of course the sealing should be such as to allow venting of the space 17 from the unsealed end upon reactor depressurization.

In the event of a slow or sudden depressurization within the reactor cavity in which the insulation structure of the invention is employed, coolant which has permeated the fibrous layer 11 (but which does not circulate therein) will need to be outgassed. This is readily accomplished, since the coolant in the layer 11 passes into the spaces 17 and thereby is vented rapidly without causing undue pressure differentials to exist across the isolation means 16. Were the spaces 17 and the retaining means 14 not provided, pressure differentials could exist across the isolation means 16 sufficient to cause a permanent deformation of the plates 27.

Figure 3:
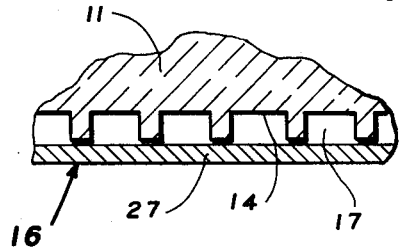
FIG. 3 is a full section view of a portion of an insulation structure illustrating a further embodiment of the invention.

The configuration of the corrugated wall 14 may be sinusoidal as shown in the drawings, or may comprise a rectangular wave type configuration situation as shown in FIG. 3.

The overall system employed in the reactor utilizing insulation structures in accordance with the invention may comprise several separate regions using the insulation structure of the invention. Each region may be independently contained and vented to particular chosen regions within the reactor system.

By way of example, insulation structures of the invention may be employed in a reactor system where the main core cavity is 35 feet diameter and height. An insulation structure in accordance with the invention can be provided occupying only one-half inch thickness of annulus. Such an insulation structure can allow a 400 pound per square inch per second rate of depressurization and still limit the pressure differential across the isolation means 16 to less than 0.5 pounds per square inch. Where gas turbines are employed directly driven by the coolant in a nuclear reactor power generation system, the insulation structure of the invention becomes particularly advantageous, since rapid changes of pressure could occur as a result of normal operation in such a system.

It may therefore be seen that the invention provides an improved insulation structure for a pressure vessel cavity. The invention is particularly useful in the case of prestressed concrete reactor pressure vessels for nuclear reactor systems. The invention allows for proper insulation while being capable of sustaining rapid depressurization without permanent damage.

Various modifications of the invention in addition to those shown and described herein will become apparent to those skilled in the art from the foregoing description and accompanying drawings. Such modifications are intended to fall within the scope of the appended claims.

What is claimed is:

1. In a pressure vessel cavity wherein there is a possibility of rapid depressurization, an insulation structure comprising, a layer of fibrous insulation adjacent the cavity wall, retaining means for said layer comprising a wall extending in contact therewith on the side of said layer opposite the cavity wall, said retaining means having a plurality of fluid passages therethrough communicating with said layer, isolation means for preventing circulation of fluid in said layer, said isolation means comprising a pressure barrier spaced from said layer and said retaining means on the opposite side of said retaining means from said layer to define a gas flow space between said isolation means and said retaining means for venting said layer through said fluid passages upon depressurization of the cavity, and support means secured to the pressure vessel and supporting said layer, retaining means and isolation means.

2. A structure according to claim 1 wherein said retaining means comprise a corrugated wall engaging both said isolation means and said layer.

3. A structure according to claim 2 wherein said wall is perforated.

4. A structure according to claim 1 wherein said isolation means comprise a plurality of fitted plates and means sealing the seams between said plates.

5. In a pressure vessel cavity wherein there is a possibility of rapid depressurization, an insulation structure comprising, a layer of fibrous insulation supported adjacent the cavity wall, an isolation wall spaced from said layer on the side of said layer opposite the cavity wall for preventing circulation of fluid in said layer, and a perforated corrugated wall positioned between said isolation wall and said layer for retaining said layer in place, the corrugations of said corrugated wall defining with said isolation wall a plurality of fluid flow passages for venting said layer upon depressurization of the cavity and means secured to the pressure vessel and supporting said layer, corrugated wall and isolation wall.

6. A structure according to claim 5 wherein said layer, said corrugated wall and said isolation wall are coaxial and cylindrical, and wherein the fluid flow passages defined by said corrugated wall and said isolation wall extend parallel with the axis of said layer.

7. A structure according to claim 5 wherein the corrugations in said corrugated wall are of a rectangular-wave type configuration.

8. A structure according to claim 5 wherein the corrugations of said corrugated wall are sinusoidal.

* * * * *